United States Patent [19]

Miller et al.

[11] Patent Number: 5,709,900
[45] Date of Patent: *Jan. 20, 1998

[54] METHOD FOR MANUFACTURE OF LOW FAT NATURAL CHEESE

[75] Inventors: Mark S. Miller, Arlington Heights; Kevin J. Surber, Lombard; David Mehnert, Antioch; Paul Wrezel, Chicago; Sylvia Irene Crawford, DesPlaines; Ronald L. Meibach, Deerfield, all of Ill.

[73] Assignee: Kraft Foods, Inc., Northfield, Ill.

[ * ] Notice: The term of this patent shall not extend beyond the expiration date of Pat. No. 5,532,018.

[21] Appl. No.: 610,043

[22] Filed: Mar. 4, 1996

Related U.S. Application Data

[63] Continuation-in-part of Ser. No. 195,270, Feb. 14, 1994, Pat. No. 5,532,018.

[51] Int. Cl.$^6$ .................................. A23C 19/00
[52] U.S. Cl. .................. 426/582; 426/34; 426/36; 426/575; 426/577; 426/578; 426/804
[58] Field of Search ....................... 426/804, 582, 426/36, 34, 38, 575, 576, 577, 578

[56] References Cited

U.S. PATENT DOCUMENTS

| | | | |
|---|---|---|---|
| 5,064,660 | 11/1991 | Silver | 426/527 |
| 5,080,913 | 1/1992 | Gamay | 426/39 |
| 5,094,873 | 3/1992 | Kerrigan et al. | 426/582 |
| 5,108,773 | 4/1992 | Smith et al. | 426/582 |
| 5,171,603 | 12/1992 | Singer et al. | 426/572 |
| 5,213,827 | 5/1993 | Nauth et al. | 426/36 |
| 5,215,778 | 6/1993 | Davison et al. | 426/582 |
| 5,225,220 | 7/1993 | Gamay | 426/39 |
| 5,244,687 | 9/1993 | Rybinski et al. | 426/582 |
| 5,277,926 | 1/1994 | Batz et al. | 426/582 |
| 5,393,550 | 2/1995 | Tarr et al. | 426/573 |
| 5,532,018 | 7/1996 | Miller et al. | 426/582 |

FOREIGN PATENT DOCUMENTS

| | | |
|---|---|---|
| A 0617898 | 10/1994 | European Pat. Off. . |
| WO 91/17663 | 11/1991 | WIPO . |
| WO A 92/06598 | 4/1992 | WIPO . |
| WO 95/01729 | 1/1995 | WIPO . |

*Primary Examiner*—Lien Tran
*Attorney, Agent, or Firm*—Fitch, Even, Tabin & Flannery

[57] ABSTRACT

A low-fat natural cheese is manufactured from skim milk or skim milk cheese. In one embodiment, a gel-forming fat mimetic is added to skim milk to provide a cheese substrate. The gel-forming fat mimetic may be gelled in situ. The cheese substrate is then subjected to a cheese make procedure to provide a cheese curd. The cheese curd is then cured to provide a low-fat skim milk cheese. The skim milk cheese is comminuted and heated to a temperature of from about 140° F. to about 180° F. for a period of time sufficient to provide a homogeneous cheese mass. The cheese mass is then packaged to provide a low-fat natural cheese.

13 Claims, No Drawings

METHOD FOR MANUFACTURE OF LOW FAT NATURAL CHEESE

CROSS-REFERENCE TO RELATED APPLICATION

This application is a continuation-in-part of application Ser. No. 195,270 filed Feb. 14, 1994 now U.S. Pat. No. 5,532,018.

FIELD OF THE INVENTION

The present invention is directed to a low fat natural cheese produced by a melt and mold process and to a method for manufacture thereof. More particularly, the invention is directed to a low-fat natural cheese which is prepared from skim milk or skim milk cheese and a gel-forming fat mimetic to provide a non-fat cheese product which is similar in body and texture to natural cheese.

BACKGROUND OF THE INVENTION

There is a continuum of cheese products which exist between those products which are considered to be natural, such as cheddar cheese, and those which are highly processed by heat and contain non-dairy components, such as pasteurized process cheese food. In the center of the continuum are cheese products which are considered to be natural, but which utilize heat processing and manipulation of the curd, such as pasta filata cheese.

The basic concept of the invention disclosed herein is that a variety of natural cheese products can be made starting with a single fat free curd if that curd is subjected to a downstream process in which ingredients including flavor, color and texture modifiers are incorporated into the melted product. The melted product is molded into a standard form which can be then cut and wrapped like conventional natural cheese. The method of the invention has been termed the melt-and-mold process.

Processed cheese products containing a substantial level of fat are well known in the food industry and Standards of Identity have been established by the United States Food and Drug Administration for several types of processed cheese products.

In accordance with the Standards of Identity, pasteurized processed cheese is the food prepared by comminuting and mixing, with the aid of heat, one or more natural cheeses of the same or two or more varieties. Specifically excluded from use in the preparation of pasteurized processed cheese, however, are cream cheese, neufchatel cheese, cottage cheese, low fat cottage cheese, cottage cheese dry curd, cooked cheese, hard grating cheese, semisoft part-skim cheese, part-skim spice cheese and skim milk cheese. The pasteurized processed cheese is prepared by heating the natural cheese with an emulsifying agent while mixing into a homogeneous plastic mass. During its preparation, pasteurized processed cheese is heated for not less than 30 seconds at a temperature of not less than 150° F. The moisture content of pasteurized processed cheese cannot be more than 43%, except that the moisture content of pasteurized process washed curd cheese or pasteurized process colby cheese cannot be more than 40%. The moisture content of pasteurized process Swiss cheese or pasteurized process Gruyere cheese is not more than 44%. The moisture content of pasteurized process Limburger cheese is not more than 51%.

The fat content (dry basis) of pasteurized processed cheese cannot be less than 47% except that the fat content of pasteurized process Swiss cheese is not less than 43% and the fat content of pasteurized process Gruyere cheese is not less than 45%.

The emulsifying agents prescribed for use in the manufacture of pasteurized process cheese are one or any mixture of two or more of the following: monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, and sodium potassium tartrate.

Pasteurized process cheese food is prepared in a manner similar to that of pasteurized processed cheese except that the moisture content is not more than 44% and the fat content is not less than 23%. For pasteurized processed cheese food, addition of cream, milk, skim milk, buttermilk, cheese whey and any of the foregoing from which part of the water has been removed can be used. Anhydrous milkfat, dehydrated cream, albumin from cheese whey and skim milk cheese can also be used in pasteurized processed cheese food. The same emulsifying agents permitted in the manufacture of pasteurized processed cheese can also be used in the manufacture of pasteurized processed cheese food.

Pasteurized process cheese spread is prepared in a manner similar to pasteurized processed cheese and pasteurized processed cheese food. The moisture content of a pasteurized processed cheese spread is more than 44%, but not more than 60%, and the fat content is not less than 20%. The same emulsifying agents can be used. In addition, the use of gums is permitted in the manufacture of pasteurized processed cheese spread. The gums can be selected from the group consisting of carob bean gum, gum karaya, gum tragacanth, guar gum, gelatin, sodium carboxymethyl cellulose, carrageenan, oat gum, sodium alginate, propylene glycol alginate and xanthan gum. The total weight of the gums cannot be more than 0.8% of the weight of the finished pasteurized processed cheese spread.

It would be desirable to provide a non-fat natural cheese which emulates the body and texture of natural cheese which contains substantial levels of milk fat. With increasing consumer awareness, the focal point of the food industry is on reducing fat and calorie consumption. Low-fat, low Calorie foods, which look and taste similar to their full fat, higher calorie counterparts, are eagerly sought by the consumer. Researchers in the food industry have concentrated on developing food products which are nutritious and palatable and which contain substantially reduced levels of fat containing ingredients. This is particularly true in the dairy industry, where low calorie, low-fat products, such as skim milk, yogurt and reduced fat ice cream have been successfully marketed. The high fat levels associated with processed cheese products have been thought to be necessary to maintain a desirable creamy mouthfeel associated with pasteurized processed cheese products. The combination of high total solids, contributed in part by the high fat content, and the relatively low pH have been necessary to provide shelf stability in shelf-stable, pasteurized process cheese products.

It is a principal object of the present invention to provide a method for producing a non-fat natural cheese from skim milk or skim milk cheese.

It is another object of the present invention to provide a method for producing a non-fat natural cheese from skim milk or skim milk cheese which has the body and mouthfeel of natural cheese.

SUMMARY OF THE INVENTION

The present invention is directed to a low-fat natural cheese manufactured from skim milk or skim milk cheese. In one embodiment of the invention, a gel-forming fat mimetic is added to skim milk to provide a cheese substrate. The gel-forming fat mimetic may be gelled in situ or may be pregelled. The cheese substrate is then subjected to a cheese make procedure to provide a cheese curd. The cheese curd is then cured to provide a low-fat skim milk cheese. The skim milk cheese is comminuted and heated to a temperature of from about 140° F. to about 180° F. for a period of time sufficient to provide a homogeneous cheese mass. The cheese mass is then packaged to provide a low-fat natural cheese.

In another embodiment of the method of the invention, a mixture of skim milk cheese, a gel-forming fat mimetic and an emulsifying salt is provided. The mixture is heated to a temperature of from about 140° F. to about 180° F. The mixture is held at the elevated temperature for a period of from about 0.5 minutes to about 8 minutes to provide a homogeneous cheese mass. The cheese mass is then packaged to provide a low fat natural cheese.

DETAILED DESCRIPTION OF THE INVENTION

An integral part of the invention is the use of an aqueous gel-forming fat replacement or fat mimetic ingredient. The fat mimetic may be incorporated at various stages of the downstream process. Alternatively, the fat mimetic may be incorporated into the cheese curd during clotting of the milk with standard cheese coagulants (i.e., during the "upstream process"). Both of these options will be discussed and illustrated with examples. By using different color and flavor ingredients, the process is capable of producing fat free versions of many natural cheese varieties including cheddar, mozzarella, monterey jack, colby, longhorn and muenster. The final products have the taste, texture and appearance of conventional natural cheese products containing much higher levels of fat. The taste and texture of the melt-and-mold products are superior to fat free products made by conventional coagulation techniques.

In one embodiment of the invention, an aqueous gel-forming fat mimetic is incorporated into the cheese curd at the time of coagulation. This is referred to as the "upstream process". The upstream process is carried out by use of a conventional cheesemaking process with the fat mimetic present in the milk at the time of coagulation. The following is a typical upstream process for incorporation of fat mimetic into fat free cheese curd.

Pasteurized milk from which most of the fat has been removed by skimming is heated in a cheese vat to 85° F. to 95° F., preferably 88° F. to 98° F. Cheese cultures are added when the vat reaches the desired temperature. Other ingredients including approved food colors and vitamins are also added at this point. Calcium solutions may also be added as an aid to coagulation.

During the initial ripening period, the gel-forming fat mimetic is added to the vat. The fat mimetic may be added at the beginning of ripening or later during this period depending upon the desired effect on the initial growth of the cheese culture organisms. For example, a fat mimetic which contains a readily available source of carbohydrate, such as a maltodextrin gel, may overstimulate the culture, resulting in too much acid formation early in the cheesemaking process. In this case, the gel-forming fat mimetic would be added at the end of the ripening period, just prior to addition of the coagulant. The typical ripening period is from 45 minutes to 1 hour and is terminated when acidity reaches the desired level. A milk coagulating enzyme, such as rennin is then added.

Most gel-forming fat mimetic ingredients are based on carbohydrate components and generally fall into two classes: starch or hydrolyzed starch and cellulose or gums.

Examples of fat mimetic starches include those made from corn starch (e.g., AMALEAN™ from American Maize, N-LITE™ series from National Starch), tapioca or rice. Small granule starches such as rice are particularly preferred. Pregelatinized or instant starches can be incorporated into the cheese milk in the nonhydrated form, or preblended with a portion of the cheese milk. Starch hydrolysis products include gelling dextrins and maltodextrins, typically D.E. of about 1 to 6, from a variety of starch sources, including but not limited to, tapioca (e.g., N-OIL™ from National Starch), potato (e.g., PASELLI™ from Avebe), corn (e.g., MALTRI™ from Grain Processing Corp.), rice (e.g., RICE*TRIN from Zumbro) and oats (e.g., OATRIM™, TRIMCHOICE™ from Staley). The latter is a particularly preferred source of maltodextrin as it includes a portion of beta-glucan (1 to 10%) which modifies the functionality of the maltodextrin gel.

Examples of gel-forming fat mimetics from the cellulose or gum class include, but are not limited to, those made from pectin (e.g., SLENDID™ from Hercules), carrageenan, alginate, gellan, cellulose gel and konjac flour (e.g., NUTRI-COL™ from FMC). Several of these ingredients are provided as microbeads or microgels. The microgel form is particularly preferred for this invention. During dispersion of the fat mimetic gel prior to incorporation into the bulk of the cheese milk, a mixer is used to break up the pregelled fat mimetic into microgel particles, which are easily entrapped in the cheese protein matrix. By initially providing the fat mimetic in the microgel form, a uniform dispersion is easily obtained. Dispersion of the fat mimetic gel is described below.

Fat mimetics of the starch class are fully digestible, contributing about 4 cal/g compared to about 9 cal/g for fat. However, since they are fully hydrated in their gelled form, if the gel replaces an equal weight of fat, the actual calorie contribution is much less. For example, if the milk fat in a cheese preparation is replaced by an equal amount of a gel containing 25% by weight of a maltodextrin gel, the caloric content of the replacement is ⅑ that of the fat which is being replaced. Fat mimetics of the cellulose or gum class are not generally digestible and contribute very little to the caloric content of the product.

There are several options for incorporating the gel-forming fat mimetic. If the ingredient easily gels without any necessary pretreatment such as heat, high or low pressure homogenization, or addition of ions, the ingredient can be added dry or nonhydrated to the vat. Even if added in this manner, it is preferred to fully disperse the ingredient in a portion of the cheese milk prior to adding to the cheese vat. The starch and hydrolyzed starch fat mimetic components can be added in a dry non-hydrated particulate state and gelled in situ during the cheese making process. The cellulose and gum fat mimetics do not gel in situ and must be pregelled prior to addition. For this reason, an important embodiment for incorporating the mimetic into the cheese milk is in a pregelled form. A concentrated gel is formed prior to cheesemaking, allowed enough time to fully set, and then fully dispersed in a portion of the cheese milk prior to addition to the cheese vat. The gel strength of the pregelled fat mimetic should be approximately the same as butterfat at the temperatures of the cheesemaking process. If the mimetic can be added either dry or pregelled, the pregelled form is preferred as it has the greatest softening effect on the curd when added in this manner.

For example, when a maltodextrin-based fat mimetic gel is used, a solution is prepared a few days prior to the cheesemaking process. The concentration of the solution depends on the gelling ability and potential gel strength of the particular source and D.E. of the ingredient. Typically, those maltodextrins with D.E. of less than 6 are capable of forming gels. Lower D.E. maltodextrins form gels with less concentrations than required for higher D.E. maltodextrins. Typical maltodextrins of D.E. 2–4 require about 10–25% concentrations to achieve the desired gel strength. The solution is heated according to the supplier's directions to fully disperse and dissolve the components. Since maltodextrin gels develop their full gel strength over a period of several days, following dissolution the preparation is held refrigerated for 1–4 days prior to incorporation into the cheese vat. The amount of maltodextrin is typically from about 0.5% to about 2.0% by weight of the cheese milk.

The fat mimetic is dispersed in a portion of the cheese milk which had not been subjected to bacterial culture fermentation (i.e., the portion was removed from the vat before adding culture). The portion which is held back amounts to about 5% of the total vat. For a 1000 lb. vat, 50 lb. of the cheese milk is withheld. The gel-forming fat mimetic is fully dispersed using an agitator or mixer such as a Silverson or Tekmar mixer. Mixers of this type consist of a stationary mixing head enclosing a high speed rotating cutting blade which subjects the fat mimetic to a cutting action which disperses it as fine particulates in the milk. The consistency of the dispersed fat mimetic is that of a heavy dairy cream, such as a 40–45% butterfat-containing cream. The dispersed fat mimetic is added to the remainder of the vat while it is being stirred.

Following addition of the gel-forming or pregelled fat mimetic, the cheese milk is processed by conventional methodology. Coagulants such as calf chymosin or bacterial rennets are added, stirring is stopped and the vat is allowed to coagulate quiescently. The curd is cut into small cubes, typically ¼" to ½", allowed to heat without stirring, and then cooked by stirring while slowly raising the temperature over a period of 30 minutes to 1 hour. Cutting and cooking of the curd facilitates expulsion of whey. One of the advantages of inclusion of the fat mimetic in the curd is to prevent over expulsion of whey which typically occurs in fat free cheese curd.

As the cooking proceeds, the pH continues to decrease due to bacterial metabolism of lactose in the milk. By controlling the cook temperature, overdevelopment of acid can be prevented. Lower cook temperatures of 100° F. to 106° F. are preferred. Alternatively, very high cook temperatures typical of Swiss Cheese manufacture, typically 120° F. to 135° F., may be used to rapidly inactivate the bacteria, thus preventing overdevelopment of acid while still allowing adequate syneresis of curd. Whey is removed when the pH reaches 5.8 to 6.3, preferably 6.0 to 6.1.

There are several options for further treatment of the drained curd: the curd can be pressed under whey in a typical Swiss make procedure; it can be drained while stirring on a drain table, followed by salting and pressing, in a typical stirred curd cheddar procedure; or it can be formed into mats in the cheese vat, followed by milling, salting and pressing, in a typical milled curd cheddar procedure. The latter (i.e., milled curd procedure) is the preferred process because it is the least damaging to the curd structure. This allows more of the mimetic to be retained in the cheese protein matrix. The Swiss make is also gentle, but typically results in production of too much acid.

The milled curd may also be processed as a pasta filata-type cheese, such as mozzarella cheese. This involves subjecting the milled curd to a cooking and stretching process, during which the curd is formed into a plastic mass when the internal temperature of the cheese reaches about 130° F. Balls of the plastic mass are formed and brined in a concentrated salt solution typical of mozzarella cheese. A brineless mozzarella process may also be used, in which the cheese is salted during cooking and stretching.

The final pH of the curd is very important in its subsequent ability to be melted and molded. We found that pH 5.2 to pH 5.5, preferably pH 5.35 to pH 5.4, provides the best cheese for the melt-and-mold process.

Other options for modifying the upstream process include control of pH via ripening and cook time and temperatures, and fortification of the vat with condensed or ultrafiltered skim milk.

The steps involved in further processing of cheese made from skim milk involve grinding the cheese, blending with optional ingredients, melting the blend in a cooker, pouring or extruding the molten cheese into molds, cooling the cheese, cutting or shredding and packaging. Optional ingredients include flavor and color ingredients. They may also include pH modifiers and emulsifier salts. However, when the emulsifier salts are used, they are used in lower amounts than would typically be used in process cheese, thereby avoiding the complete destabilization of the protein matrix which is desired in process cheese, but which would be deleterious to natural cheese body and texture. Fat mimetic ingredients may be included in the optional ingredients if the fat mimetic ingredient was not already incorporated into the curd during upstream processing.

In one embodiment of this invention, the cheese from the upstream process contains a fat mimetic ingredient incorporated at the cheese vat. Typically, the cheese from the upstream process is aged at 40° F. to 45° F. for a minimum of 3 weeks prior to subjecting it to downstream processing. The aging period allows some form of breakdown of the cheese protein matrix. If the cheese is subjected to downstream processing without a prior aging period, strong interactions within the protein matrix cause expulsion of water from the matrix resulting in a grainy and crumbly texture in the final product. Proper aging of the cheese is characterized by smooth melting during the cooking stage, total incorporation of moisture with no loss during the cooking stage, and a smooth plastic texture of the final product.

The fat-mimetic containing cheese is ground in a conventional cheese grinder, and blended in a ribbon blender or other piece of conventional equipment with salt, flavor, color, pH modifiers, emulsifying salts and vitamin supplements if desired. The upstream processing to which the cheese had been subjected is not as important as the aging to which it has been subjected and subsequent degree of protein breakdown. This is discussed below. Consequently, a variety of cheese types are suitable for downstream processing, including those which have been made by milled-curd or stirred-curd cheddar processes, pressed under whey in a typical swiss process, or cooked and stretched as mozzarella. Pasta Filata-type cheese, such as mozzarella, is particularly preferred for downstream processing. Since this type of cheese was previously subjected to a melting and molding process, the subsequent cooking steps are facilitated.

The amount of salt to be added at this stage is dependent upon the amount of salt in the cheese. The salt level of the cheese is in turn dependent on the amount of salt added to the curd (if starting cheese is a cheddar-make variety) or which was absorbed during the brining step (if starting cheese is a mozzarella or swiss-make variety). The desired level of salt in the final product is typically from 1.5 to 2.0%.

The amount and type of color and flavor depends on the desired color and flavor of the final product. Color ingredients to be added at this stage include annatto, apocarotenal and opacifiers. For example, if the final product is to be a cheddar-type variety, approximately 0.06% annatto color is added to the blend along with the appropriate amount of cheddar flavor and/or enzyme modified cheese. If a mozzarella-type cheese is desired, color modifiers may not be necessary, except for a minimum amount of opacifier, such as $TiO_2$, to achieve the desired opacity. The amount and type of flavor added to this product is one which would be more suited to a mozzarella cheese.

Modifiers of pH include sodium salts of bicarbonate, citrate and phosphate. The desired pH for smooth melting of the product is from about 5.1 to about 5.5, with the most preferred target pH being from about 5.2 to about 5.35. The pH of the starting cheese is typically 5.0 to 5.2. The amount of pH modifier required to raise the pH to the target is from 0 to 0.5%. The moisture level of the final product ranges from 54% to 64%, preferably from 56% to 60%.

The cheese blend is heated to melting using a variety of standard food processing equipment. A steam-jacketed or otherwise thermally controlled sigmoid blade mixer, such as a Day mixer, or a Z-blade mixer, such as that manufactured by Reado, provides the proper type of mechanical shear to fully plasticize the blend without causing destabilization. A laydown cooker, equipped with a single helical screw and a steam injector, is the preferred option for cooking the cheese blend in a manufacturing plant. Extrusion-type cookers, including cooker-stretchers such as Pasta Filata extruders, are also preferred, especially for those varieties of cheese which texture is related to the uniaxial orientation of the curd, such as mozzarella and string cheese. The blend may also be subjected to a continuous cooking process, such as that described by Zamzow, et al. U.S. Pat. No. 4,898,745, which describes a method for manufacturing Pasta Filata cheese with extended shelf life.

The temperature at which the blend is cooked may range from 140° F. to 180° F., although the preferred temperature for this type of Cheese (i.e., containing fat mimetic gel) is between 140° F. and 160° F. The time which the cheese blend is held at these temperatures is that which is sufficient to assure that the entire blend has reached the same temperature and has fully melted, preferably from about 0.5 minutes to about 8 minutes. The ability of the cheese to melt and form a stable plastic mass at these temperatures is dependent upon the age of the cheese, and the degree to which the casein components have been broken down or hydrolyzed by the action of the enzymes in the cheese. A minimum of 3 weeks age is required if the cheese is aged at 40° F. to 45° F. Less time would be required if the cheese was aged at higher temperatures. Between 1 to 3 weeks aging are required if the cheese is held at 45° F. to 55° F.

Care must be taken during the cooking step to prevent destabilization. Destabilization is characterized by separation of an aqueous composition from the proteinaceous matrix. Furthermore, destabilization is accompanied by formation of dense protein aggregates which result in a grainy or mealy appearance and texture of the product. In extreme cases, the product fails to plasticize and remains as a liquified suspension of precipitated protein aggregates. In less extreme cases, the protein matrix plasticizes, but fails to retain all of the moisture present in the blend. In this case, the resulting protein matrix upon cooling becomes firm and rubbery. Destabilization may be prevented by taking several precautions; using fat mimetic containing cheese which have been properly aged; controlling the rise in temperature of the cooker to prevent overheating either the entire mix or portions of it; regulating the speed of the auger (in a laydown, sigmoid, or Z-blade mixer) to impart the least amount of shear necessary to manipulate the blend into a plasticized mass.

Following the cooking step, the molten cheese is transferred to a mold to cool. Large molds, such as those holding more than 40 lb. of product, do not allow for adequate cooling and are to be avoided. The optimum size of the cheese mold is 5 lb. to 20 lb. Upon cooling, blocks of this size can be easily cut and wrapped as 0.5 lb. to 1 lb. blocks. Alternatively, the molten cheese is packed directly into 1 lb. molds, which require no cutting before being wrapped. The molten product may also be shaped into balls or chunks, typical of mozzarella. It may also be pumped into chub casing, 3–6 inches in diameter. Upon cooling, the chubs can be cut into cylindrical or half-moon shaped blocks which are typical of longhorn or midget longhorn-style cheese.

In another embodiment of this invention, the starting material is a high moisture skim milk cheese, which does not contain a fat mimetic ingredient tapped within the matrix of the curd. High moisture skim milk cheese is made by a conventional stirred-curd process. The steps involved in further processing high moisture skim milk cheese include the same steps which were described in the previous discussion of fat mimetic containing cheese; grinding the cheese, blending with optional ingredients, melting the blend in a cooker, pouring or extruding the molten cheese into molds, cooling the cheese, cutting or shredding and packaging. The additional ingredients are the same as previously described and they include the gel-forming fat mimetic, since the fat mimetic ingredient was not incorporated into the curd during upstream processing.

Skim milk cheese useful in the present invention can be made by a conventional process involving the setting of skim milk with a milk coagulating enzyme and rennet, followed by a whey separation step or can be manufactured by processes which utilize ultrafiltration to concentrate the skim milk followed by evaporation to provide the cheese. The skim milk cheese used in the method of the present invention generally has a moisture content of from about 40% to about 60% moisture. All percentages used herein are by weight, unless otherwise indicated.

In accordance with one process for the manufacture of the skim milk cheese used in the process of the present invention, the skim milk cheese is prepared from a skim milk source which can be selected from skim milk, a skim milk retentate produced by ultrafiltration of skim milk, concentrated skim milk, reconstituted non-fat dry milk or a mixture of any two or more of these with water in a quantity not in excess of that sufficient to reconstitute any concentrated skim milk or non-fat dry milk used to the level of moisture found in whole milk which has had the milkfat separated therefrom, i.e., about 91% moisture. The skim milk source, which may be pasteurized, and which may be warmed is subjected to the action of lactic acid producing bacteria which are either present in the milk or are added thereto. Sufficient rennet or other suitable milk-clotting enzyme is added to the skim milk to set the skim milk to a semi-solid mass. Calcium chloride may also be added in a quantity of not more than 0.02%.

The mass is cut, stirred and heated with continued stirring so as to promote the separation of whey and curd. The whey is drained off and the curd is matted into a cohesive mass. Proteins from the whey may be incorporated into the cheese mass. The mass is cut into slabs which are piled and handled so as to further promote the drainage of whey and the development of acidity. The slabs are then cut into pieces, which may be rinsed by pouring or sprinkling water over them, with free and continuous drainage. The duration of the rinsing is limited so that only the whey on the surface of the curd pieces is removed. The curd is salted, stirred, further drained and pressed into forms. Certain animal or plant enzymes, which are capable of aiding in the curing or development of flavor of the skim milk cheese, may be added during the procedure.

U.S. Pat. No. 4,476,143 to Czulak, et al., U.S. Pat. No. 3,156,568 to Hargrove, et al. and U.S. Pat. No. 5,037,659 to Trecker, et al. describe processes for the manufacture of cheese from skim milk. In this connection, the term "skim milk cheese" as used herein is meant a natural cheese prepared from skim milk which has developed some flavor through ripening and which has from about 40% to about 60% moisture.

The same options for incorporating the gel-forming fat mimetic which were described for the upstream process also apply to use of these ingredients in the downstream process. For those ingredients which gel easily, the ingredients can be added dry or nonhydrated to the blender along with the other dry ingredients. Even if the ingredient requires a heating step to allow full hydration, it may still be added as a dry powder if sufficient heat is provided later in the process, i.e., during the cooking step. Even if added in this manner, it is important to provide sufficient water in the formulation to allow full hydration of the gel, according to the manufacturer's recommendations. Optionally the dry ingredient is fully dispersed in water or in a wet mix at the same concentration that it would normally be present as a fat mimetic gel. A preferred method for incorporating the mimetic into the cheese blend is in a pregelled form. A concentrated gel is formed ahead of time, allowing enough time to fully set. The gel is ground in the same manner as the cheese ingredient and added with the other optional ingredients at the blender. The gel strength of the pregelled fat mimetic should be approximately the same as butterfat at the temperatures of the cheesemaking process.

If the gel-forming fat mimetic can be added either dry or pregelled, the pregelled form is preferred as it has the greatest softening effect on the final product when added in this manner. Gels which are irreversibly destroyed by heating are not preferred, as they would lose their water holding ability during the cooking stage. For example, if a maltodextrin-based fat mimetic gel is used, a solution is prepared a few days prior to the downstream process. A rather rigid gel is desired, which can retain its structure during the grinding step. For a typical gelling maltodextrin, the concentration of the solution is about 20–35% depending on the gelling ability and potential gel strength of the particular source of maltodextrin. The amount of maltodextrin is typically from about 1.0% to 6.0% by weight of the cheese blend.

A preferred source of maltodextrin is from hydrolyzed flours, such as that made from hydrolyzed oat flour and marketed under the trade name OATRIM™ by Staley. OATRIM™ is made by a process described in U.S. Pat. Nos. 4,996,063 and 5,082,673 to Inglett, incorporated herein by reference. The amount of hydrolyzed oat flour (or a combination of hydrolyzed oat and corn flour) in the final formulation is from about 2% to about 7%, preferably from 3.5% to 5.5%, most preferably from 4.5% to 5.5%. It may be added as a gel stock, containing 25% to 35% of the hydrolyzed flour, added to the blender after initial grinding. Conversely, it may be added as hydrated wet mix, at 25% to 35% solids, added at the cooker. The dry powder may also be added at the blender, with sufficient moisture added as water or condensate from the steam injector to allow complete hydration.

The final concentration of salt is at 1% to 2.5%, preferably about 2%. About 1% salt comes in with the high moisture skim curd, the rest being added at the blender. Food colors, including opacifiers, are included as required for the desired final appearance of the cheese. Flavors are added as required, as are vitamin supplements. The final moisture of the product ranges from 54% to 62%, preferably 56% to 59%. The pH of the product ranges from 5.0 to 5.8, preferably from 5.2 to 5.6, more preferably from 5.35 to 5.45.

The age of the high moisture skim cheese is sufficient to allow some breakdown of the alpha-casein component. The amount of alpha-casein remaining after the aging process is 10% to 30% of the proteins, preferably 15% to 25% of the protein.

The cooking temperature can range from 140° F. to 180° F., preferably 160° F. to 180° F., more preferably from 165° F. to 175° F. The cooking time can range from 0.5 minute to 8 minutes, preferably from 2 minutes to about 5 minutes. When a laydown-type cooker is used, the auger speed is adjusted from 100 to 200 rpm, preferably from 150 to 175 rpm.

If pH modifiers or emulsifier salts are required to raise the pH or temper the melting, they are present at levels which are below those which are used to process cheese. The reason for keeping these ingredients low is to avoid the soft plastic process cheese type texture which results from complete disruption of the protein matrix. Lactic acid and sodium bicarbonate are used to lower or raise the pH, respectively. Emulsifier salts, including citrate and phosphate salts, may be present at from 0% to 1.3% of the blend weight. Sodium citrate is a preferred salt for modification of melting properties, and it is used at from about 0.5% to about 1.0% The same cheese blend may be used for very different final products by the inclusion or omission of 0.5% to 1% sodium citrate, so that, for example, a stretchy cheese such as mozzarella would benefit from low levels (0% to 0.5% citrate) while a more smooth melting variety, such as queso blanco, would best be blended with 0.5% to 1% citrate.

In accordance with the method of the invention, the skim milk cheese is preferably comminuted to provide particles of skim milk cheese. The skim milk cheese particles are then combined with the gel-forming fat mimetic and an emulsifying salt, if used. The mixture of skim milk cheese particles, gel-forming fat mimetic and emulsifying salt is heated to a temperature in the range of from about 140° F. to about 180° F. The mixture is held at the elevated temperature for a period of from about 0.5 minutes at the highest temperature to about 8 minutes at the lowest temperature to provide a homogeneous cheese mass. The cheese mass is then packaged to provide a low fat cheese with body and texture properties similar to processed cheese made from natural cheese having a substantial level of milk fat.

The skim milk cheese generally has a moisture content of from about 40% to about 60%. The skim milk cheese is used in the natural cheese of the present invention at a level of from about 71% to about 93.5%. Water is added in the mixture to provide water for hydration of the gel-forming fat mimetic. The added water is from about 4% to about 21%. An emulsifying salt, if used, is present at a level of from about 0.5% to about 1.3%.

The skim milk cheese and the gel-forming fat mimetic are combined in a suitable apparatus for heating the skim milk cheese. Prior to being heated, the skim milk cheese is preferably comminuted to provide particles of skim milk cheese having a size of from about 1/16 inch to about 3/8 inch.

An emulsifying salt may also be used in the mixture of the present invention for preparing processed cheese products. The emulsifying salts generally prescribed for use in the manufacture of pasteurized processed cheese are useful in the present invention. These emulsifying salts are one or any mixture of two or more of the following: monosodium phosphate, disodium phosphate, dipotassium phosphate, trisodium phosphate, sodium metaphosphate, sodium hexametaphosphate, sodium acid pyrophosphate, tetrasodium pyrophosphate, sodium aluminum phosphate, sodium citrate, potassium citrate, calcium citrate, sodium tartrate and sodium potassium tartrate. The emulsifying salt is used at a level of from about 0.5% to about 1.3%.

What is claimed is:

1. A method for manufacture of low fat natural cheese comprising;
    (a) adding a gel-forming fat mimetic selected from the group consisting of starch and starch hydrolysis products to skim milk to provide a cheese substrate;
    (b) setting, cutting, cooking and draining said substrate to provide a cheese curd containing a fat mimetic gelled in situ;
    (c) curing said cheese curd to provide low-fat skim milk cheese having a gelled matrix dispersed therein;
    (d) comminuting said skim milk cheese and heating said cheese to an elevated temperature of from about 140° F. to about 180° F.;
    (e) holding said cheese at said elevated temperature for a period of from about 0.5 minutes to about 8 minutes; to provide a homogeneous cheese mass; and
    (f) packaging said cheese mass to provide a low-fat cheese.

2. A method in accordance with claim 1 wherein said gel-forming fat mimetic is present in said cheese substrate at a level of from about 0.5% to about 2.0%, dry solids basis.

3. A method in accordance with claim 1 wherein said starch hydrolysis products are dextrins and maltodextrins having a DE of from about 1 to about 6 produced by hydrolysis of a starch selected from the group consisting of corn starch, rice starch, tapioca starch, potato starch and oat starch.

4. A method in accordance with claim 1 wherein said gel-forming fat mimetic is added to said skim milk as a dry powder.

5. A method in accordance with claim 1 wherein an emulsifier salt is added to said comminuted skim milk cheese at a level of from about 0.5% to about 1%.

6. A method for manufacture of a low-fat processed cheese comprising:
    (a) providing a mixture comprising a skim milk cheese, a gel-forming fat mimetic selected from the group consisting of starch and starch hydrolysis products, from 0 to 1.3% of an emulsifying salt and water for hydration of said gel-forming fat mimetic;
    (b) heating said mixture to an elevated temperature of from about 140° F. to about 180° F.;
    (c) holding said mixture at said elevated temperature for a period of from about 0.5 minutes to about 8 minutes to provide a homogeneous cheese mass; and
    (d) packaging said cheese mass to provide a low-fat processed cheese.

7. A method in accordance with claim 6 wherein said skim milk cheese is present at a level of from about 71% to about 93.5% by weight, said gel-forming fat mimetic is present at a level of from about 2% to 7% by weight (dry basis) and said emulsifying salt is present at a level of from about 0.5% to about 1.0% by weight and from about 4% to about 21% added water.

8. A method in accordance with claim 6 wherein sodium chloride is present in said mixture at a level of from about 1% to about 2.5% by weight.

9. A method in accordance with claim 6 wherein said gel-forming fat mimetic is present in said cheese substrate at a level of from about 0.5% to about 2.0%, dry solids basis.

10. A method in accordance with claim 6 wherein said starch is selected from the group consisting of non-gelatinized and pre-gelatinized corn starch, tapioca starch and rice starch.

11. A method in accordance with claim 6 wherein said starch hydrolysis products are dextrins and maltodextrins having a DE of from about 1 to about 6 produced by hydrolysis of a starch selected from the group consisting of corn starch, rice starch, tapioca starch, potato starch and oat starch.

12. A method in accordance with claim 6 wherein said gel-forming fat mimetic is added to said skim milk as a dry powder.

13. A method in accordance with claim 6 wherein said emulsifier salt is sodium citrate which is present at a level of from about 0.5% to about 1%.

* * * * *